(12) United States Patent  (10) Patent No.: US 7,278,220 B1
Lin  (45) Date of Patent: Oct. 9, 2007

(54) PLUMB BOB WITH ADJUSTABLE WEIGHTS

(76) Inventor: You Teng Lin, No. 3, Lane 283, Huamei St, West District, Taichung City (TW)

( * ) Notice: Subject to any disclaimer, the term of this patent is extended or adjusted under 35 U.S.C. 154(b) by 23 days.

(21) Appl. No.: 11/398,394

(22) Filed: Apr. 4, 2006

(51) Int. Cl.
*G01C 9/12* (2006.01)
(52) U.S. Cl. .......................... 33/392; 33/398
(58) Field of Classification Search ............... 33/391, 33/392, 393, 394, 398
See application file for complete search history.

(56) References Cited

U.S. PATENT DOCUMENTS

| | | | | |
|---|---|---|---|---|
| 485,376 | A * | 11/1892 | Fuller | 33/392 |
| 1,025,828 | A * | 5/1912 | Paul | 33/392 |
| 2,492,884 | A * | 12/1949 | Patermaster | 33/392 |
| 3,405,450 | A * | 10/1968 | Peacock | 33/393 |
| 3,448,525 | A * | 6/1969 | Majewski | 33/398 |
| 3,720,001 | A * | 3/1973 | Majewski | 33/392 |
| 2006/0242852 | A1* | 11/2006 | Lin | 33/392 |

* cited by examiner

*Primary Examiner*—G. Bradley Bennett
(74) *Attorney, Agent, or Firm*—Pro-Techtor Int'l Services (57) ABSTRACT

A plumb bob with adjustable weights for suiting different applications is disclosed that includes, in one embodiment, a bottom point; a shank extended upward from the point and having a lower portion and an upper threaded section; hollow first weight elements adapted to put on the lower portion of the shank and rested upon the point; hollow second weight elements having an axial threaded hole and being adapted to put on a portion of the threaded section of the shank to threadedly secure thereto with the first weight elements being fastened thereunder; a hollow projecting knob including an axial bore having lower threads and a top shoulder; and a string including a bottom knot engaged with and stopped at the shoulder. The knob is adapted to threadedly secure to the remaining portion of the threaded section of the shank.

8 Claims, 8 Drawing Sheets

PLUMB BOB WITH ADJUSTABLE WEIGHTS

BACKGROUND OF THE INVENTION

1. Field of Invention

The present invention relates to plumbing devices and more particularly to a plumb bob having adjustable weights so as to suit different applications.

2. Related Art

Figure 1:
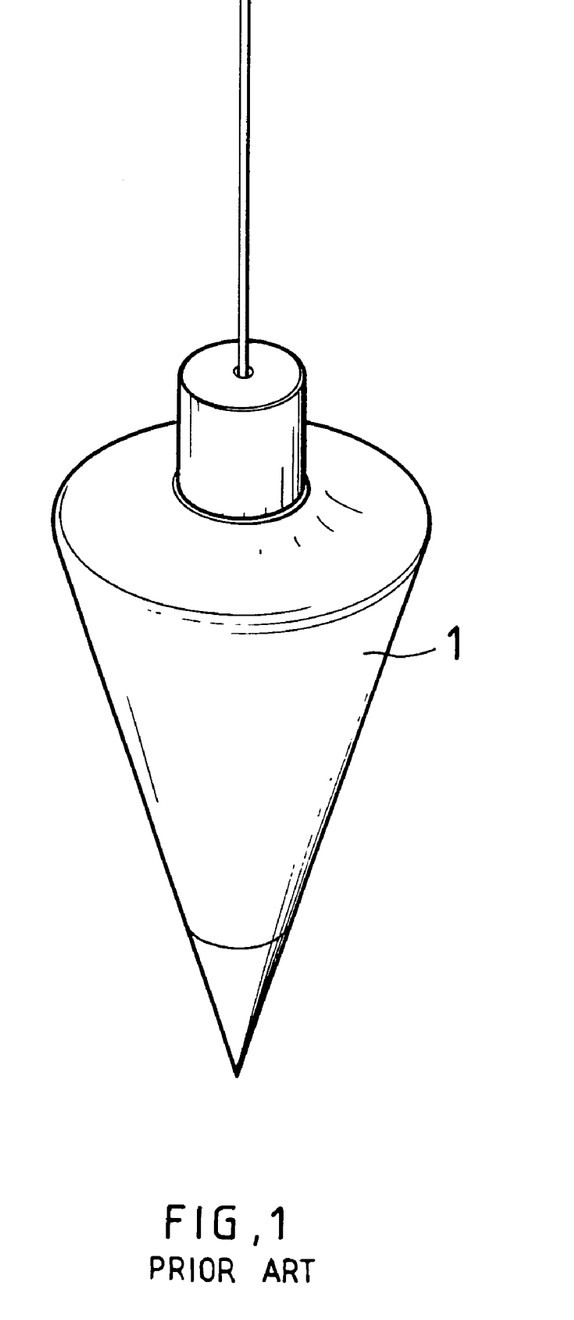
FIG. 1 is a perspective view of a conventional plumb bob.
Figure 2:
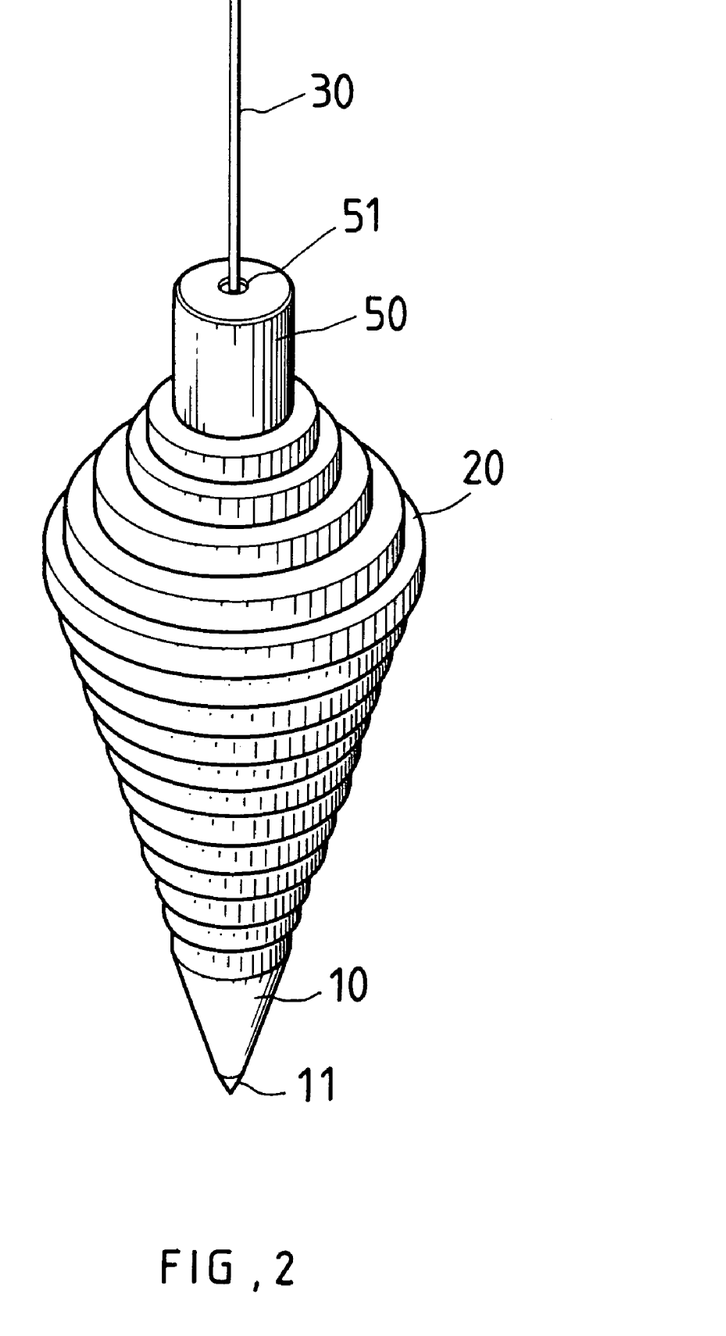
FIG. 2 is a perspective view of a first preferred embodiment of plumb bob according to the invention.
Figure 3:
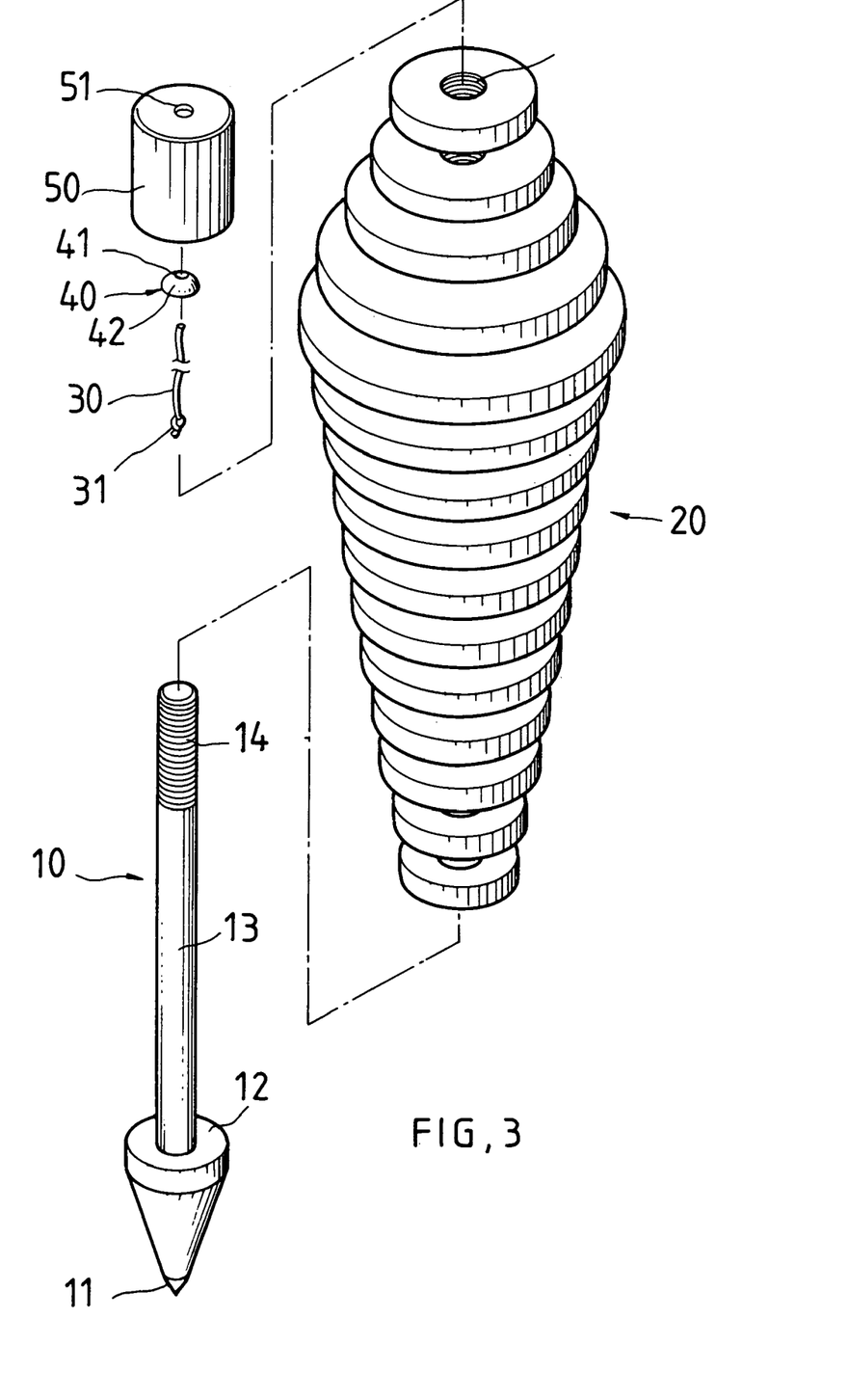
FIG. 3 is an exploded view of the plumb bob in FIG. 2.
Figure 4:
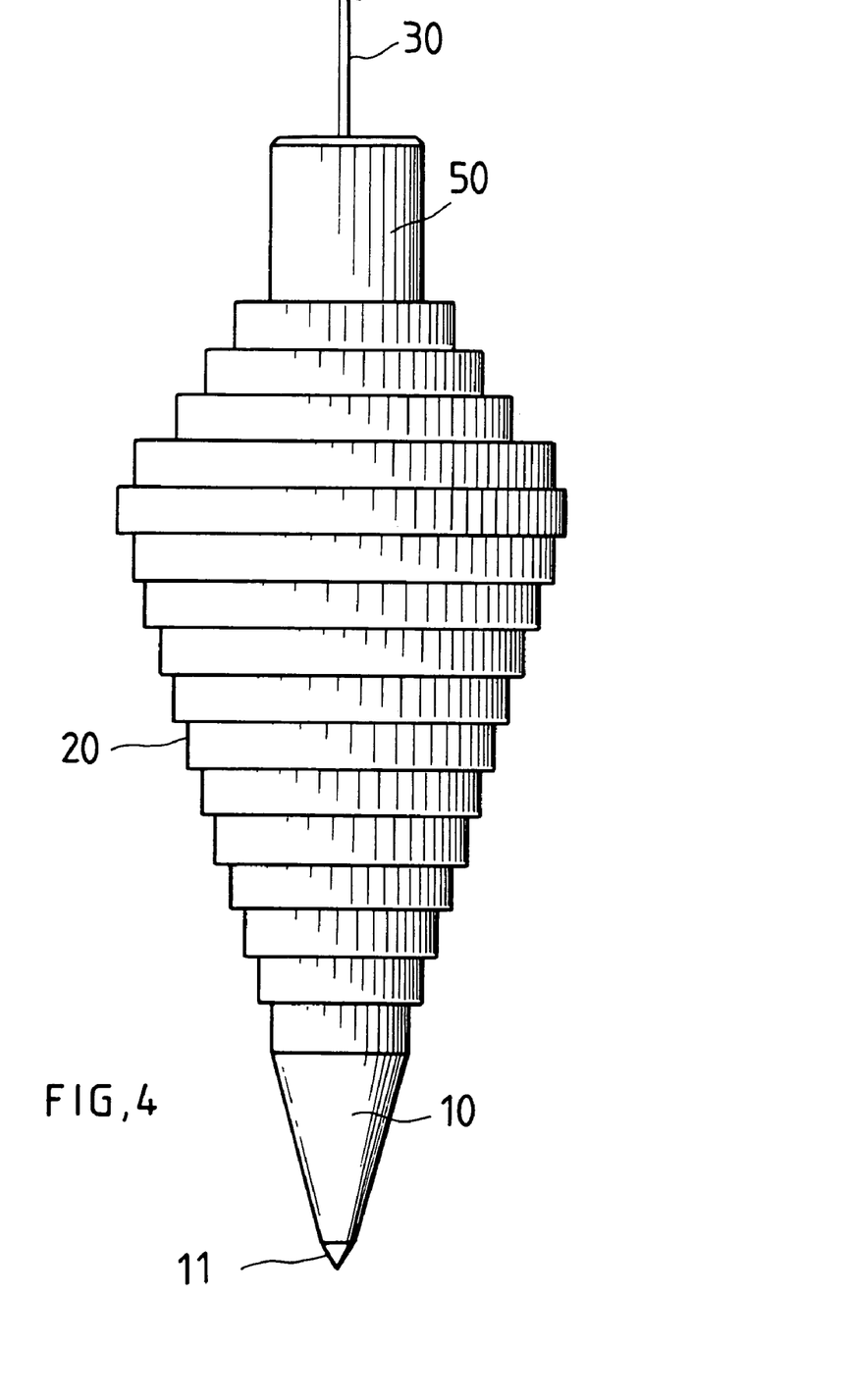
FIG. 4 is an elevation view of the plumb bob in FIG. 2.
Figure 5:
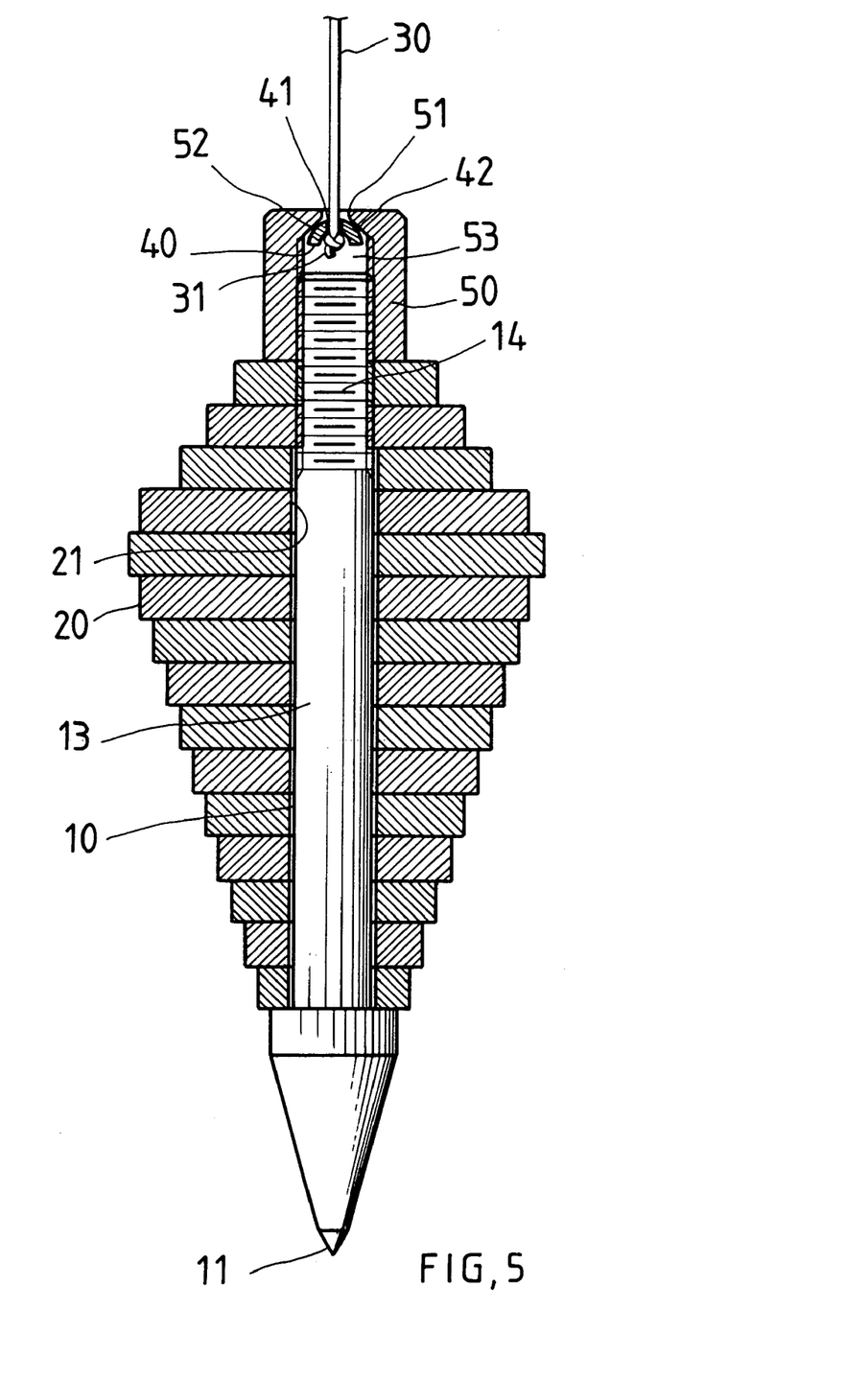
FIG. 5 is a sectional view of the plumb bob in FIG. 2.

The establishment of a vertical reference above a datum for a construction worker to transfer a datum from one level to another is an everyday requirement in the construction field. One of the most common tools to accomplish the function is a plumb bob. A conventional plumb bob 1 is shown in FIG. 1 and comprises an integral, conic weight and a string affixed thereto. Conventionally, the weight is made either by shaping an integral metal piece or by an injection molding process.

However, each of the prior techniques suffered from one or more disadvantages. For the former, material waste is inevitable. For both, weight mass is fixed. Thus, the prior plumb bob is not adapted to different applications by adjusting its weight. Hence, the need for improvement still exists.

SUMMARY OF THE INVENTION

It is therefore an object of the present invention to provide a plumb bob comprising a bottom point; a shank extended upward from the point and having a lower portion and an upper threaded section; a plurality of hollow first weight elements adapted to put on the lower portion of the shank and rested upon a top of the point; a plurality of hollow second weight elements having an axial threaded hole and being adapted to put on a portion of the threaded section of the shank to threadedly secure thereto with the first weight elements being fastened thereunder; a hollow projecting knob including an axial bore having lower threads and a top shoulder; and a string including a bottom knot engaged with and stopped at the shoulder; wherein the bore of the knob is adapted to threadedly secure to the remaining portion of the threaded section of the shank.

It is another object of the present invention to provide a plumb bob comprising a bottom point; a shank extended upward from the point and including a lower portion and an upper threaded section having a transverse hole formed through its upper portion; a plurality of hollow first weight elements adapted to put on the lower portion of the shank and rested upon a top of the point; a plurality of hollow second weight elements having an axial threaded hole and being adapted to put on a portion of the threaded section of the shank to threadedly secure thereto with the first weight elements being fastened thereunder; a nut threadedly secured to the remaining portion of the threaded section of the shank; and a string including a bottom knot formed on a top of the threaded section of the shank by looping a lower end of the string around the hole of the shank.

In one aspect of the present invention each of the first and second weight elements is a disc-shaped member having a central circular bore.

In another aspect of the present invention each of the first and second weight elements is a square member having a central square bore.

In a further aspect of the present invention each of the first and second weight elements is a triangular member having a central square bore.

The above and other objects, features and advantages of the present invention will become apparent from the following detailed description taken with the accompanying drawings.

DETAILED DESCRIPTION OF THE INVENTION

Referring to FIGS. 2 to 6, a plumb bob in accordance with a first preferred embodiment of the invention comprises a collar 10 including a lower conic member 12, a point 11 at a bottom of the conic member 12, a shank 13 extended upward from the conic member 12, and a threaded section 14 on an upper portion of the shank 13; and a plurality of disc-shaped, hollow weight elements 20 having threads on its central bore 21 dimensioned and shaped to fit snugly on the shank 13.

The plumb bob further comprises a hollow, cylindrical cap 50 including an upper axial bore 51, a lower threaded inner surface 53, and a conic inner surface 52 interconnecting the bore 51 and the threaded inner surface 53; a circular stop 40 including an axial hole 41 and a conic upper surface 42; and a string 30 including a bottom knot 31.

An assembly operation of the invention will be described in detailed below. First, insert the shank 13 of the collar 10 into the bores 21 of a selected number of the weight elements 20 until the weight elements 20 are rested on the conic member 12. Next, put a number of the weight elements 20 on the shank 13 and threadedly secure same to a lower portion of the threaded section 14. As such, the weight elements 20 and the collar 10 are fastened together. Next, pass a top of the string 30 through the hole 41 and the bore 51 to attach the knot 31 to a bottom of the stop 40 with the stop 40 matingly engaged with the conic inner surface 52. Next, threadedly secure the threaded inner surface 53 of the cap 50 to the remaining upper portion of the threaded section 14 of the collar 10. As an end, a complete plumb bob is formed.

Figure 6:
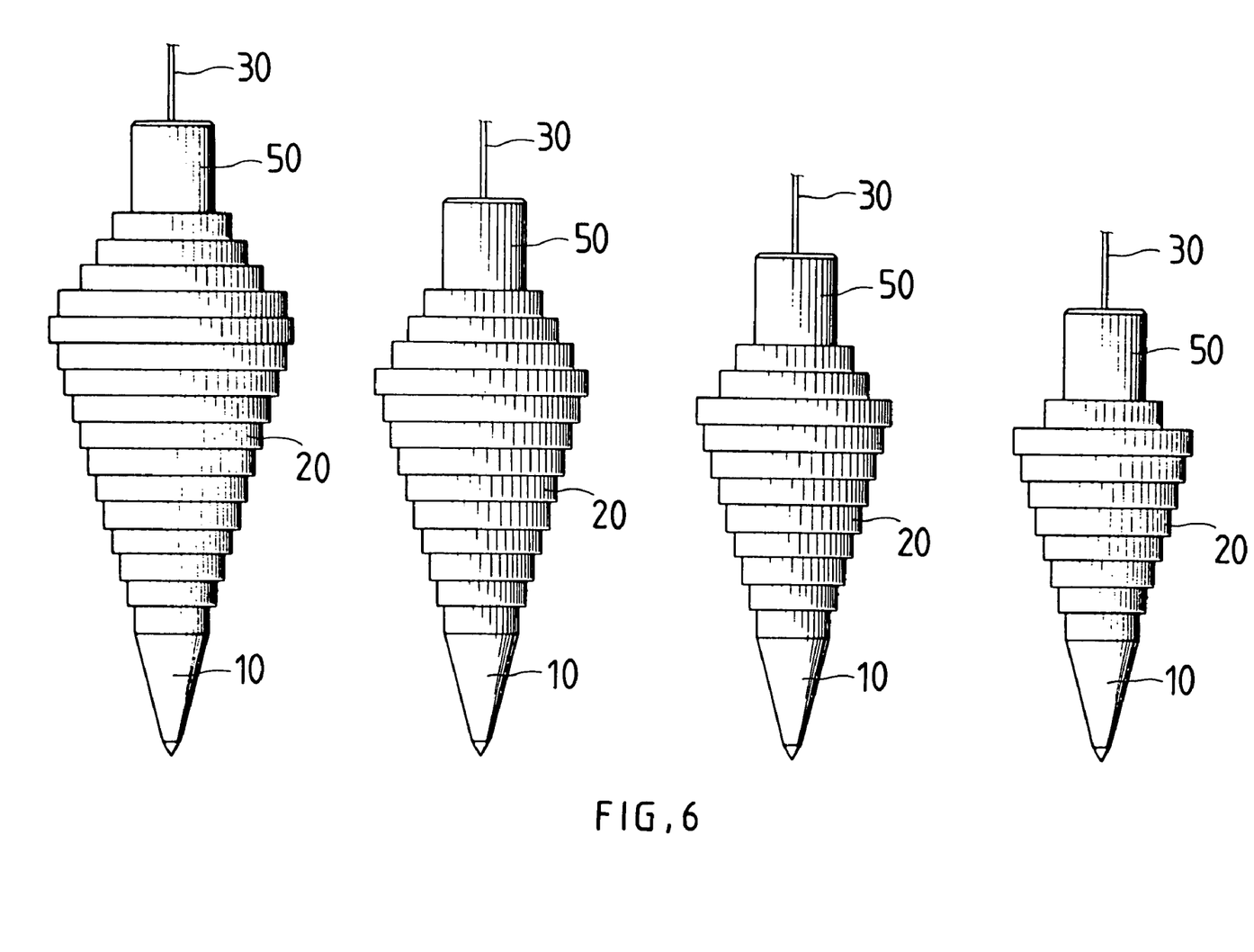
FIG. 6 is a perspective view of four plumb bobs according to the first preferred embodiment of the invention having different weights formed by assembling.

As shown in FIG. 6, a person may select a desired number of weight elements 20 to put on a selected collar 10 of a specific height so as to form one of a number of different plumb bobs having different weights for being adapted to different applications.

Figure 7:
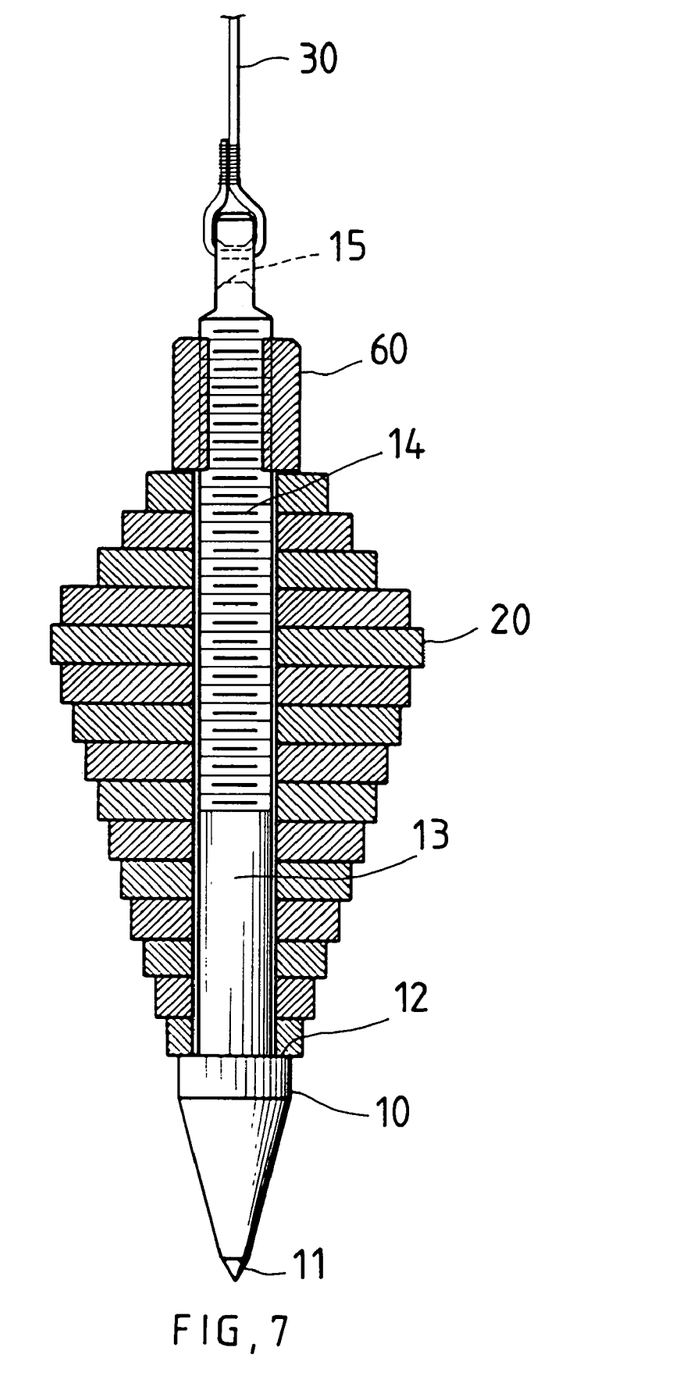
FIG. 7 is a sectional view of a second preferred embodiment of plumb bob according to the invention.

Referring to FIG. 7, a second preferred embodiment of plumb bob according to the invention is shown. The second embodiment is identical to the first embodiment, except that the threaded section 14 is longer, a transverse hole 15 is formed through an upper portion of the threaded section 14 such that a knot may be formed on a top of the threaded section 14 by looping the string 30 around the hole 15, and the cap 50 is replaced by a nut 60. Thus, the nut 60 is threadedly secured to an upper portion of the threaded section 14 and the remaining portion of the threaded section 14 is threadedly secure to more number of the weight elements 20.

Figure 8:
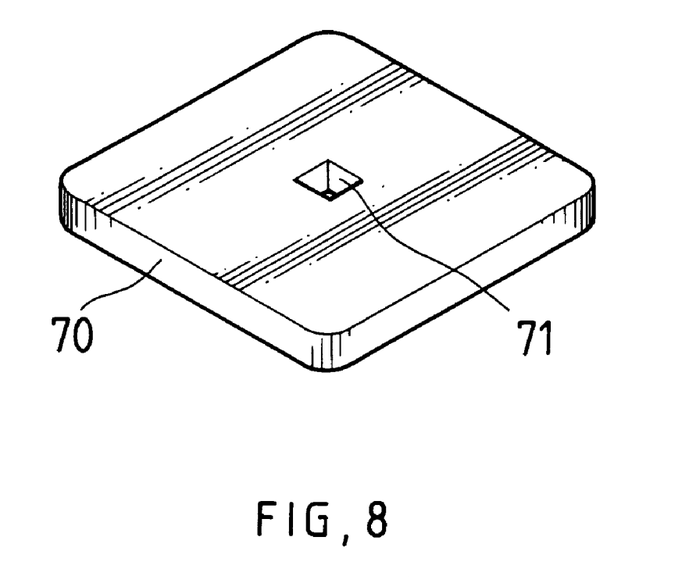
FIGS. 8 and 9 are perspective views of two different configurations of weight element in either embodiment.
Figure 9:
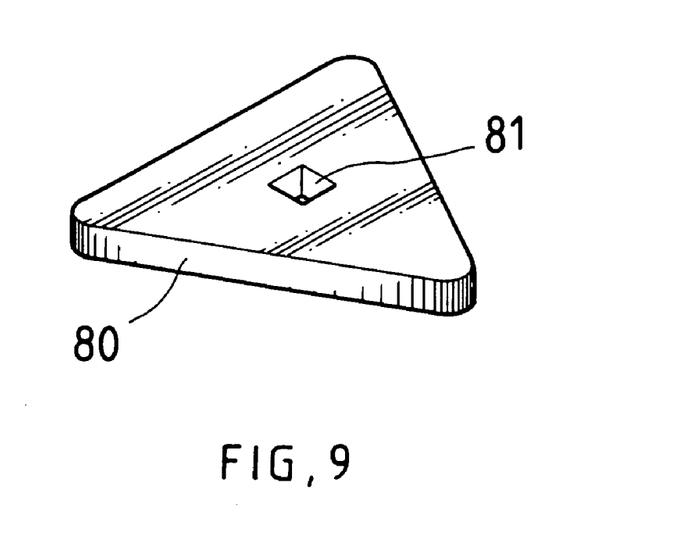

Referring to FIGS. 8 and 9, two different configurations of weight element in either embodiment are shown. In FIG. 8, the weight element 70 is a square member having a central square bore 71. In FIG. 9, the weight element 80 is a triangular member having a central square bore 81.

While the invention herein disclosed has been described by means of specific embodiments, numerous modifications and variations could be made thereto by those skilled in the art without departing from the scope and spirit of the invention set forth in the claims.

What is claimed is:

1. A plumb bob comprising:
   a bottom point;
   a shank extended upward from the point and having a lower portion and an upper threaded section;
   a plurality of hollow first weight elements adapted to put on the lower portion of the shank and rested upon a top of the point;
   a plurality of hollow second weight elements having an axial threaded hole and being adapted to put on a portion of the threaded section of the shank to threadedly secure thereto with the first weight elements being fastened thereunder;
   a hollow projecting knob including an axial bore having lower threads and a top shoulder; and
   a string including a bottom knot engaged with and stopped at the shoulder;
   wherein the bore of the knob is adapted to threadedly secure to the remaining portion of the threaded section of the shank.

2. The plumb bob of claim 1, wherein each of the first and second weight elements is a disc-shaped member having a central circular bore.

3. The plumb bob of claim 1, wherein each of the first and second weight elements is a square member having a central square bore.

4. The plumb bob of claim 1, wherein each of the first and second weight elements is a triangular member having a central square bore.

5. A plumb bob comprising:
   a bottom point;
   a shank extended upward from the point and including a lower portion and an upper threaded section having a transverse hole formed through its upper portion;
   a plurality of hollow first weight elements adapted to put on the lower portion of the shank and rested upon a top of the point;
   a plurality of hollow second weight elements having an axial threaded hole and being adapted to put on a portion of the threaded section of the shank to threadedly secure thereto with the first weight elements being fastened thereunder;
   a nut threadedly secured to the remaining portion of the threaded section of the shank; and
   a string including a bottom knot formed on a top of the threaded section of the shank by looping a lower end of the string around the hole of the shank.

6. The plumb bob of claim 5, wherein each of the first and second weight elements is a disc-shaped member having a central circular bore.

7. The plumb bob of claim 5, wherein each of the first and second weight elements is a square member having a central square bore.

8. The plumb bob of claim 5, wherein each of the first and second weight elements is a triangular member having a central square bore.

* * * * *